(12) United States Patent
Sego

(10) Patent No.: US 7,782,255 B2
(45) Date of Patent: Aug. 24, 2010

(54) SYSTEM AND METHODS FOR RADAR AND COMMUNICATIONS APPLICATIONS

(75) Inventor: Daniel J. Sego, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 210 days.

(21) Appl. No.: 11/877,049

(22) Filed: Oct. 23, 2007

(65) Prior Publication Data

US 2009/0102716 A1    Apr. 23, 2009

(51) Int. Cl.
*G01S 3/36*    (2006.01)
(52) U.S. Cl. .................................. 342/376; 342/372
(58) Field of Classification Search .............. 342/368, 342/371, 372, 376
See application file for complete search history.

(56) References Cited

U.S. PATENT DOCUMENTS

| | | | | |
|---|---|---|---|---|
| 3,646,558 | A * | 2/1972 | Campanella | 342/373 |
| 5,068,669 | A | 11/1991 | Koert et al. | |
| 5,164,735 | A * | 11/1992 | Reich et al. | 342/368 |
| 6,567,040 | B1 * | 5/2003 | Sevaston | 342/354 |
| 6,919,847 | B2 * | 7/2005 | Caplan et al. | 343/705 |
| 7,030,824 | B1 | 4/2006 | Taft et al. | |
| 7,154,434 | B1 | 12/2006 | Sego | |
| 7,307,589 | B1 * | 12/2007 | Gregoire et al. | 343/700 MS |

FOREIGN PATENT DOCUMENTS

WO    WO2006/130993    12/2006
WO    WO2008/019029    2/2008

OTHER PUBLICATIONS

Mailloux, R. J., Phased Array Antenna Handbook, Artech House, Boston 1994, pp. 314-315.

(Continued)

*Primary Examiner*—Thomas H Tarcza
*Assistant Examiner*—Cassi Galt
(74) *Attorney, Agent, or Firm*—Yee & Associates, P.C.; Kevin G. Fields

(57) ABSTRACT

A system and methods for radar and communications applications. In one embodiment the present system comprises a wireless, space-fed, phased array of antennas including a plurality of unit cells. A first one of the unit cells includes a first one of the antennas and a unit cell command interpreter configured to receive a command, determine whether the command is intended for the first unit cell, and relay the command to logic for enabling a phase shift controller of the first antenna. In one embodiment the present methods comprise the step of wirelessly beaming microwave power from a power and control beam transmit unit to illuminate a wireless, space-fed, phased array of antennas including a plurality of unit cells. The method further comprises the steps of beaming a command to the array and converting the microwave power into direct current within a first one of the unit cells. The first unit cell includes a first one of the antennas. The method further comprises the steps of supplying the direct current to components of the first unit cell to power the first unit cell, receiving the command within the first unit cell, determining whether the command is intended for the first unit cell, and relaying the command to logic for enabling a phase shift controller of the first antenna.

15 Claims, 5 Drawing Sheets

OTHER PUBLICATIONS

McSpadden, J. O. et al.; "Design and experiments of a high conversion efficiency 5.8 GHz rectenna", IEEE Transactions on Microwave Theory and Techniques, vol. 46, No. 12, pp. 2053-2060, Dec. 1998.

Strassner, B et al,; "5.8 GHz circularly polarized dual rhombic loop traveling wave rectifying antenna for low power density wireless microwave power transmission applications", IEEE Transactions on Microwave Theory and Techniques, vol. 51, No. 5, pp. 1548-1553, May 2003.

Mailloux; "Antenna Array Architecture"; Proceedings of the IEEE, IEEE; New York, US; vol. 80, No. 1, pp. 163-172; Jan. 1, 1992; XP000294639; ISSN: 0018-9219.

Extended Search Report from EPO on co-pending EP application (08253430.6) dated Jan. 30, 2009.

* cited by examiner

SYSTEM AND METHODS FOR RADAR AND COMMUNICATIONS APPLICATIONS

BACKGROUND

1. Technical Field

The present disclosure relates to radar and communications applications and in particular to those including phased arrays of antennas.

2. Description of Related Art

A phased array is a group of antennas in which the relative phases of the respective signals feeding the antennas are varied in such a way that the effective radiation pattern of the array is reinforced in a desired direction concomitantly with pattern control in undesired directions. Phased arrays come in several basic forms but are typically characterized by: an ensemble of radiating elements (the 'antennas' referred to above), a means to illuminate the elements that operates reciprocally as a beamformer (also called a feed network or manifold), an amplification, phasing and control/logic layer, an RF signal, timing and control, a power distribution layer (or mainfold), and associated support structure. Phased array antennas are almost exclusively assembled as monolithic planar structures because of the need for contiguous conductors for two-way distribution of signals, control logic, and data across the full array area. These structures frequently take the form of multilayer printed circuit boards. The feed may either be via constant electrical path length conductors or via broadcast (e.g., space feed). Current phased arrays have several drawbacks. These include: high cost, difficulty of transporting large arrays (because large arrays must be handled as unitary entities—because of contiguous signal, control and/or power distribution manifolds), high repair costs (typically about five percent of modules may fail before modules must be replaced), and high phased array antenna areal density (mass per unit aperture area).

Extensive efforts are being undertaken to reduce array costs. Evolving technical solutions directly attach transmit/receive (T/R) modules (or T-only or R-only modules) to the array backplane, instead of individual "plug-in" units. Maximizing the cost benefits of commercial assembly (for planar circuit boards) has led to more complex multi-layer circuit boards being employed. When the requisite number of failures in an antenna has occurred and the modules need to be replaced, whole panels are replaced, by disassembling the antenna, with the attendant intra-antenna interconnect issues. The panels then are factory disassembled (costs are not yet sufficiently low to discard the panel) and hand reassembled.

Incorporation of fiber optics can reduce the weight associated with signal, data, control, and beamforming manifolds. However fiber optics cannot carry the power levels necessary to operate the array, thus maintaining the monolithic array backplane for power distribution. In the case of fiber optics the weight is decreased along with system maturity while cost is increased because of the more immature photonics technologies. The power manifold and its associated weight are unaffected. Routine fold/disassembly/deploy operations are not possible in current high frequency systems. Even with photonics, the array cannot be disassembled for shipping/transport then reassembled for operation unless a complete recalibration is performed each time. Therefore, the backplane is transported in one piece, which is problematic for highly mobile users who must then fall back on non-array antenna solutions.

SUMMARY

The embodiments of the present system and methods for radar and communications applications have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description", one will understand how the features of the present embodiments provide advantages. These include a thin backplane, low areal density, ease of transport and ease of disassembly and reassembly as part of normal operation due to the array including individually removable and replaceable unit cells with no interconnections except the mechanical.

One embodiment of the present system for radar and communications applications comprises a wireless, space-fed, phased array of antennas including a plurality of unit cells. A first one of the unit cells includes a first one of the antennas. The first unit cell further includes a unit cell command interpreter configured to receive a command, determine whether the command is intended for the first unit cell, and relay the command to logic for enabling a phase shift controller of the first antenna.

One embodiment of the present methods for radar or communications applications comprises the step of wirelessly beaming microwave power from a power and control beam transmit unit to illuminate a wireless, space-fed, phased array of antennas. The array includes a plurality of unit cells. The method further comprises the steps of beaming a command to the array and converting the microwave power into direct current within a first one of the unit cells. The first unit cell includes a first one of the antennas. The method further comprises the steps of supplying the direct current to components of the first unit cell to power the first unit cell, receiving the command within the first unit cell, determining whether the command is intended for the first unit cell, and relaying the command to logic for enabling a phase shift controller of the first antenna.

Another embodiment of the present system for radar and communications applications comprises a backplane for a wireless phased array. The backplane comprises a conducting layer. First and second dielectric layers sandwich the conducting layer. First and second patch antenna conducting layers sandwich the dielectric layers. A via extends through the dielectric layers and the conducting layer and connects the patch antenna conducting layers.

The features, functions, and advantages of the present embodiments can be achieved independently in various embodiments, or may be combined in yet other embodiments.

BRIEF DESCRIPTION OF THE DRAWINGS

The embodiments of the present system and methods for radar and communications applications now will be discussed in detail with an emphasis on highlighting the unique and advantageous features. These embodiments depict the novel and non-obvious system and methods shown in the accompanying drawings, which are for illustrative purposes only. These drawings include the following figures, in which like numerals indicate like parts.

DETAILED DESCRIPTION

Embodiments of the present wireless phased array are configured to serve as electronically scanned antennas for radar or communications applications, both civil and military. The present embodiments employ all wireless protocols and processes to function as antennas for transmit-only, receive-only or transmit and receive functions without any physical connectivity and without an internal distribution manifold for power, signal, control, etc. Power for on-array electronics is provided via a power beam and an RF rectenna (radio frequency rectifying antenna). By modulating the power beam and employing demodulation and processing, the unit cell 20 (which may be interpreted as a transmit module analog) command, control and calibration instructions are provided to the array (a wireless communication analog), in conjunction with the basic RF (radar or communications) operation of a space-fed array antenna.

Figure 1:
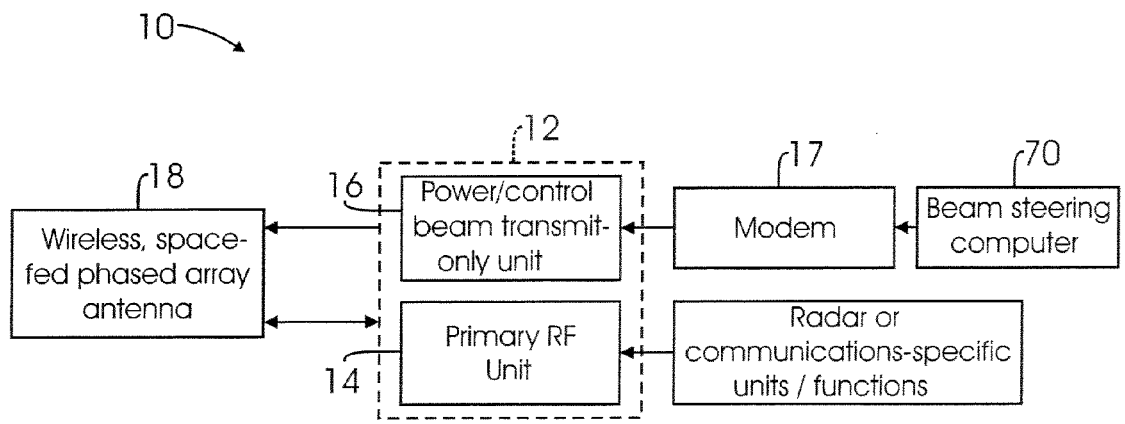
FIG. 1 is a schematic block diagram of one embodiment of the present system and methods for radar and communications applications, including a wireless, space-fed phased array antenna.

FIG. 1 illustrates a block diagram of one embodiment of the present wireless phased array antenna system 10 in a radar or communications (transmit-receive or receive only) configuration. A transmit assembly 12 contains a feed antenna 14 for the primary RF mission (which may be either a radar or communication function) and a feed antenna 16 for the power beam. The transmit assembly 12 further includes distinct, physically and electrically isolated RF channels (not shown) including waveform filtering and final amplification. In a radar or communications application the transmit assembly might also include RF receive electronics (not shown). The feed antenna 16 for the power beam receives commands generated in a beam steering computer 70. However, the commands are first converted into an analog signal by a modem 17 appropriate to the protocol selected for the wireless command and control function before being passed to the feed antenna 16.

Figure 2:
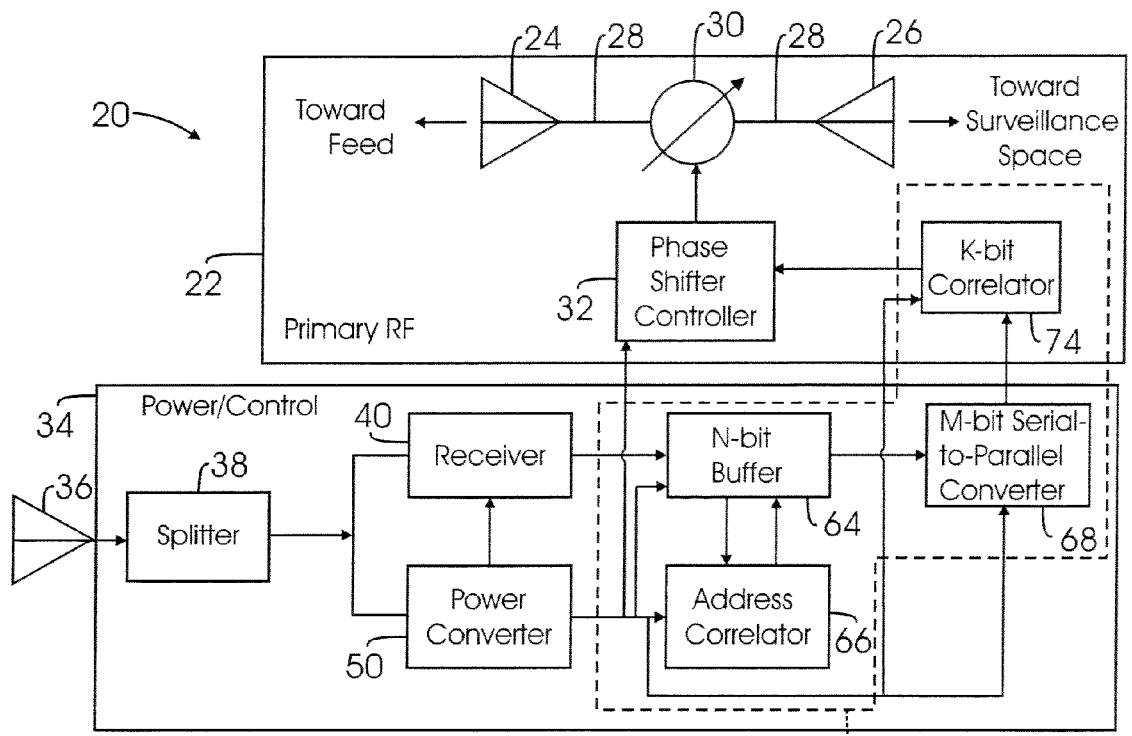
FIG. 2 is a schematic block diagram of one embodiment of a unit cell of the wireless, space-fed phased array antenna of FIG. 1.

Both feed antennas 14, 16 illuminate the inner surface of the objective antenna 18 (labeled "wireless space-fed phased array" in FIG. 1, also the primary array). Inner surface indicates the side of the array antenna facing the feed, regardless of the topology of this antenna. The power beam transfers microwave power to the objective antenna 18 to power the on-array electronics functions in each antenna unit cell 20. An example embodiment of a unit cell 20 is illustrated in FIG. 2, which is described in further detail below. The microwave power beam is received and rectified at each unit cell 20. The power beam is also modulated to encode the information to control the function of the primary RF, which is demodulated and implemented at each unit cell 20. The function of the primary RF may include a phase shifter setting for each unit cell 20, all timing to effect the phase shift to the next beam position, and possibly other functions such as switching to a dummy/matched load or modulating the phase shifter periodically, also called "spinning" the phase shifter, to support array calibration operations. Other commands that the unit cell 20 must execute may also be included in the message block to each unit cell 20. The bandwidth of the power beam modulation is thus preferably such that all necessary commands may be transmitted within the time interval necessary at each beam position. There are several options for the power beam to illuminate the primary antenna. One embodiment is a radiated beam with beamwidth that simultaneously illuminates all unit cells of the objective antenna 18. Another embodiment is a narrow beam pattern at lower power (but equivalent effective radiated power) that would be electronically scanned over the full ensemble of unit cells.

FIG. 2 illustrates one embodiment of a unit cell 20 of the present wireless phased array. The unit cell 20 comprises a basic building block from which both space-fed arrays and reflectarrays can be constructed, both operating under the same principles. In the limit, the unit cell 20 is the smallest mechanical assembly to comprise the antenna, although it is envisioned that panels comprised of a number of unit cells may be the most economical means of producing the present antenna. The unit cells 20 may be positioned on a periodic lattice (not shown), or may be part of another topology, such as a sparse array, a minimally redundant array, or similar designs including non-uniform lattices. The form of the primary array may be planar or curvilinear (e.g., hemispherical). For describing system-level attributes, a single, system level design is employed. This design includes a single example of RF antenna (edge-fed patch antenna) and a single rectenna example (also an edge-fed patch antenna). Other planar or non-planar antenna types may be substituted as dictated by specific system-level trade studies and analyses, and are functionally identical.

The unit cell 20 comprises two fundamental functions. The first is the primary RF function, which may include radar or communications functions, including receive-only as in a commercial broadcast application (e.g., satellite television). The second fundamental function is the power bean/control function. In a typical space-fed array antenna, the power and control signals are implemented via hardwired manifolds embedded within the antenna backplane and structure. In the present embodiments they are implemented using wireless principles.

The primary RF portion 22 comprises the antenna elements, including a feed side antenna 24 and a surveillance space side antenna 26. The antenna elements 24, 26 may be edge-fed patched, coupled fed patches, dipoles, or any other relevant type. The antenna elements 24, 26 are connected by a waveguide structure 28, such as a stripline, a microstrip, a coplanar stripline, or a similar construct, with a passive phase shifter 30 in the RF circuit. A phase shifter controller 32 enables the phase settings of the phase shifter 30 to electronically collimate the feed illumination signal and to steer the full array beam.

With further reference to FIG. 2, the power and control beam portion 34 of the unit cell 20 comprises one or more receive antennas 36 at an operating frequency different from that of the primary RF element 22. The number of antennas 36 is a function of the frequency of the power beam: one antenna if the frequency of the power beam is less than the primary RF portion, more than one if greater. An unbalanced splitter 38 on only one rectenna per unit cell 20 (even if multiple rectennas are employed) provides the RF signal to a receiver 40 for demodulation from which the commands for that unit cell 20 are recovered. A very weak coupling is permissible as the required signal-to-noise ratio (SNR) for an acceptable bit error rate is small. The actual levels are unique to a specific design. In one example an SNR of 7.08 dB was required for a bit error rate of 1 phase bit error per day in continuous operation. This SNR is equivalent to a signal power, with a design noise figure of 11.6 dB, of $10^{-11}$ W.

Figure 3:
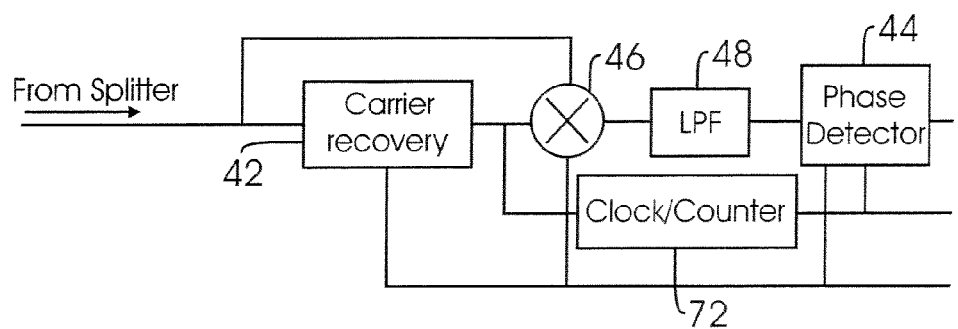
FIG. 3 is a schematic block diagram of one embodiment of the receiver of FIG. 2.

FIG. 3 illustrates one example configuration for the receiver 40. The demodulation circuitry comprises a carrier recovery stage 42, which can be implemented by any suitable approach, including square-then-divide, a Costas Loop, a phase-locked-loop (PLL), etc. With the selection of a binary phase shift keying (BPSK) modulation scheme, for example, the square-then-divide approach may be chosen for a lower prime power requirement. The phase code sequences are recovered by a phase detector 44 after a single stage down conversion in a mixer 46 and low pass filtering in a DC bypass filter (capacitor) 48.

Figure 4:
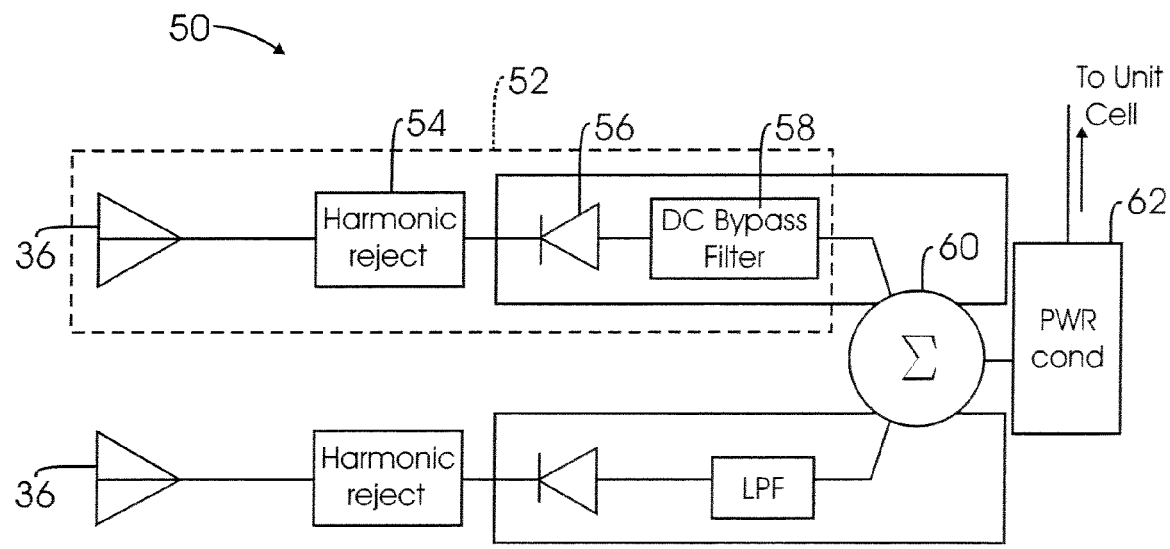
FIG. 4 is a schematic block diagram of one embodiment of the power converter of FIG. 2.

With reference to FIG. 2, the power and control beam portion 34 further comprises a power converter 50 that produces conditioned direct current from the received E power beam. FIG. 4 illustrates one example configuration for the power converter 50. The power converter 50 includes one or more rectennas 52. Each rectenna element 52 comprises a receiving antenna 36, a harmonic rejection filter 54, an RF diode 56 (such as a Schottke), and a DC bypass filter (capacitor) 58 to condition the output power. The RF diode 56 may have an impedance of several hundred ohms. It is advantageous that the antenna element 36 and/or the waveguide be matched for maximum power transfer. As those of ordinary skill in the art will appreciate, there are several design options available for matching impedances, including simply using an antenna and waveguide with the same impedance, as opposed to any impedance transition sections built as waveguide structures. As illustrated in FIG. 4, the rectenna outputs are combined in a simple summing node 60 to meet the overall power required for the unit cell 20. While FIG. 4 illustrates two rectennas 52, as many rectennas 52 may be integrated into the unit cell 20 as dictated by a specific design (rectenna element gain, power required, frequency, etc.) conditioned on achieving acceptable levels of mutual coupling between the rectennas 52 and the primary RF portion 22. After the rectenna outputs are combined in the summing node 60, they may pass through a power conditioner 62 (which would, if needed, produce prime power at any specific voltage/current levels for the varied unit cell electrical components) before the DC power is distributed to the unit cell 20 to run the demodulation and control signal implementation for electronics.

With reference to FIG. 2, the unit cell 20 includes a unit cell command interpreter 63 configured to identify commands that are intended for the unit cell 20 and to activate the phase shifter controller 32 in response to such commands. In the illustrated embodiment, the unit cell command interpreter 63 includes four components: an N-bit buffer 64, an address correlator 66, an M-bit serial-to-parallel converter 68 and a K-bit correlator 74. The operation of each of these components is described in detail below. Those of ordinary skill in the art will appreciate that the illustrated configuration for the unit cell command interpreter 63 is just one of many possibilities. Other configurations, including additional and/or alternative hardware are contemplated and within the scope of the present unit cell command interpreter 63.

When a command is received by the unit cells 20, the phase bit stream passes into an N-bit buffer 64, where N is matched to the element address length that is defined by the number of uniquely addressable elements in the antenna. An address correlator 66 contains the unit cell 20 address. If the sequence correlates with the unit cell address, then the succeeding M bits are clocked into a serial-to-parallel converter 68. Of the M bits, P are associated with the phase command for the next beam position, and K are the "time-to-go" counter message. There is no clock signal supplied to the present wireless phased array except through the coherent and phase stable power beam carrier. The time-to-go might represent the number of power beam RF cycles to count before latching the next phase state command or it might be the number of phase chips remaining. The time-to-go is a countdown that is unique to each element as the beam steering computer 70 (FIG. 1) serially transmits the beam steering commands to the array via the power beam. The output of a clock or counter 72 (for example a zero crossing filter with binary counter is shown in FIG. 3) is provided to a K-bit correlator 74 (FIG. 2), which comprises logic for enabling the phase shifter state update (for enabling the phase shifter controller 32).

The sizing of the power beam may be based on several factors, including the total DC power required by the on-array electronics functions (the minimum set are shown in FIG. 2, others might be added), the number of and gain of the rectennas 52 (including all mutual coupling effects when integrated within the unit cell 20) and the overall rectenna efficiency. Also included are the feed and the overall antenna design. For example, multiple higher gain feeds might be used, each illuminating a smaller portion of the total array surface. Regardless, the lowest gain due to the combined beam shape at any point on the array defines the limiting value for the required radiated average power from the power beam feed.

Figure 5:
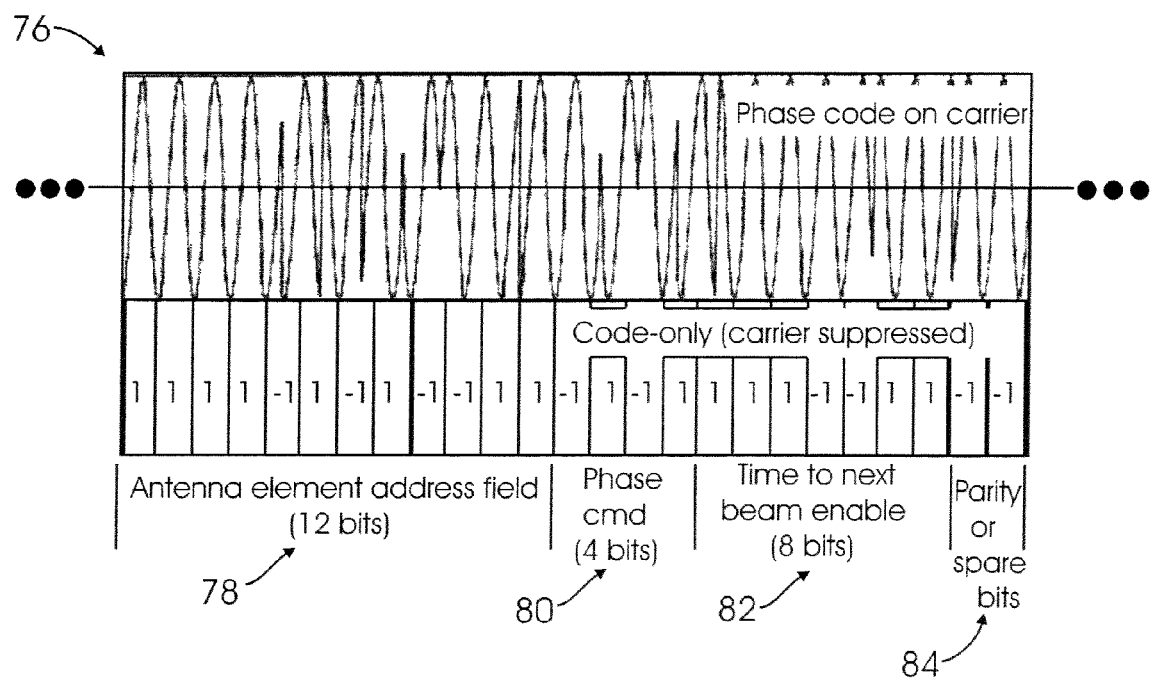
FIG. 5 is a schematic diagram of an example message format in one embodiment of a modulation scheme for the wireless, space-fed phased array antenna of FIG. 1.

In certain embodiments the modulation scheme is a simple BPSK, which makes the carrier recovery and code recovery very simple. Other modulation schemes are contemplated, including those having the on-array electrical power to demodulate the control signal. In FIG. 1 the power beam continually illuminates all elements while the control data stream serially modulates the power beam with a message or data block specifically for each unit cell 20. This modulation scheme is a direct analog of the beam steering computer function in a classical planar array. An example message format is shown in FIG. 5. Each message 76 contains a unit cell address 78, a phase shift instruction 80 for the main RF mission antenna for the next modulation period (e.g. radar beam position and coherent processing interval) and a time-to-go 82 to implement the phase command. Parity or spare bits 84 may also be provided. FIG. 5 indicates that the unit cell address 78 size is 12 bits, the phase shift instruction 80 size is 4 bits, and the time-to-go 82 size is 8 bits. However, those of ordinary skill in the art will appreciate that each of these portions of the message 76 may have different sizes. The bandwidth of the modulation accounts for the message size, the number of elements, and the time to update the phase command for the next beam position. In one example application with approximately 2100 elements a bandwidth of the power beam modulation of 16.75 MHz is required.

Figure 6:
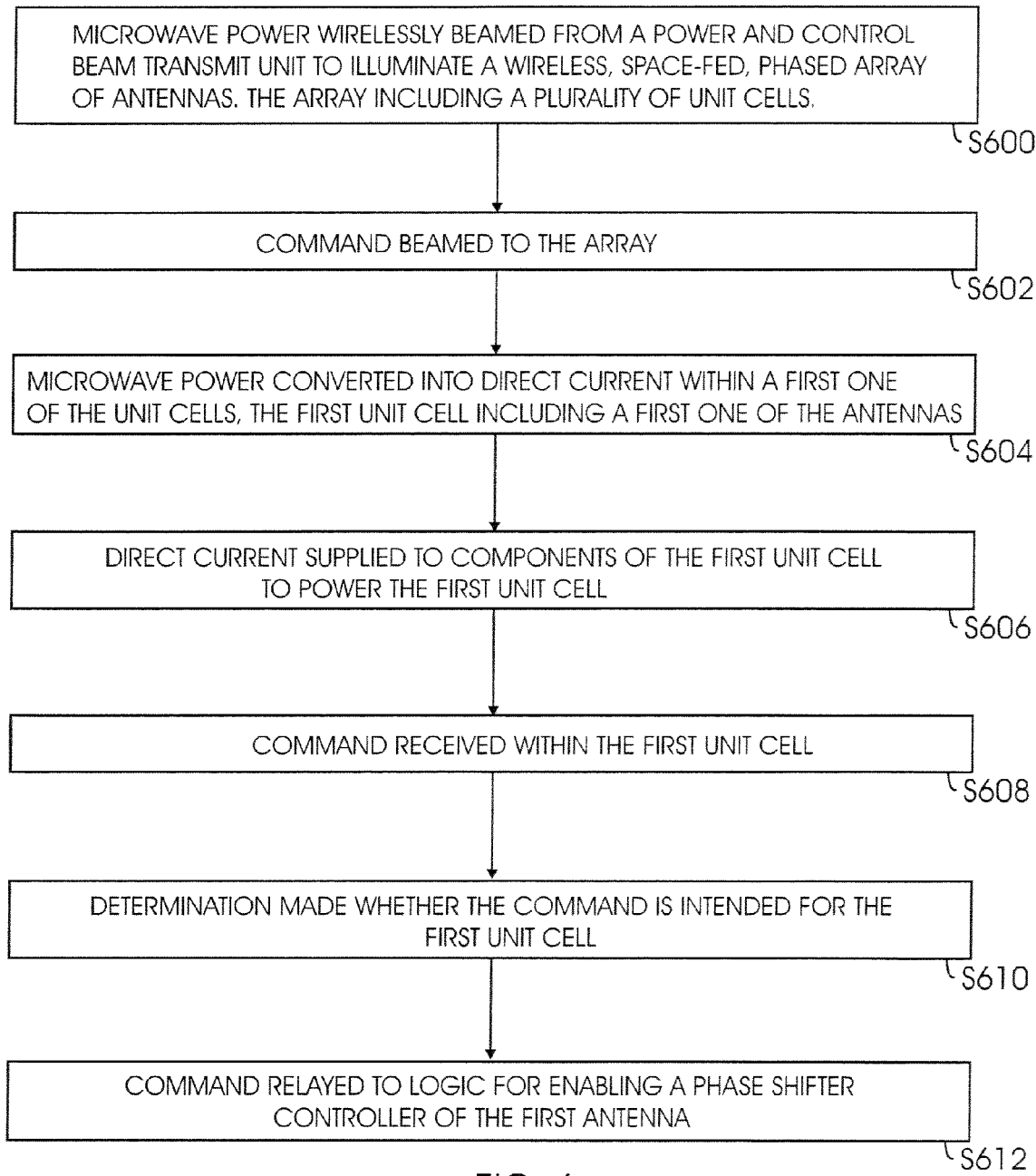
FIG. 6 is a flowchart illustrating steps in one embodiment of the present methods for radar and communications applications.

In accordance with the teachings above, FIG. 6 illustrates one example of the present methods for radar or communications applications. At step S600 microwave power is wirelessly beamed from the power and control beam transmit unit 16 to illuminate the wireless, space-fed, phased array of antennas 18. The array 18 includes a plurality of unit cells 20. At step S602 a command is beamed to the array 18. At step S604 the microwave power is converted into direct current within a first one of the unit cells 20. The first unit cell 20 includes a first one of the antennas 24, 26. At step S606 the direct current is supplied to components 32, 40, 64, 66, 68, 74 of the first unit cell 20 to power the first unit cell 20. At step S608 the command is received within the first unit cell 20. At step S610 a determination is made as to whether the command is intended for the first unit cell 20. At step S612 the command is relayed to logic 74 for enabling a phase shift controller 32 of the first antenna 24, 26.

Figure 7:
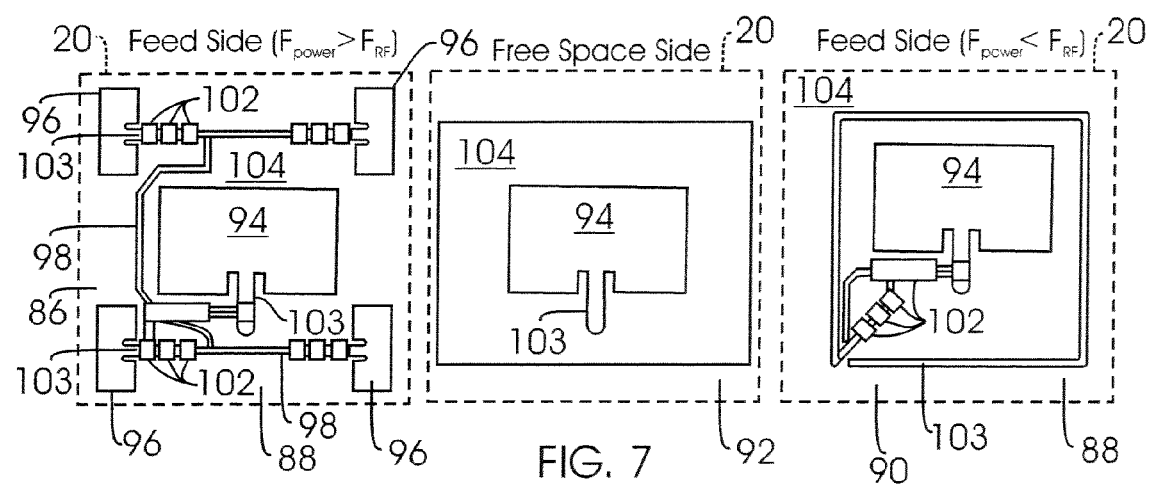
FIG. 7 is a schematic diagram of embodiments of physical layouts for the unit cell of FIG. 2.

Two examples of physical layouts for a single unit cell 20 are shown in FIG. 7. The left hand portion of FIG. 7 illustrates a first layout 86 for the feed side 88 of the unit cell 20. The feed side 88 faces toward the power beam/RF feed. The first layout 86 is configured for the power beam frequency being greater than the primary RF frequency. The right hand portion of FIG. 7 illustrates a second layout 90 for the feed side 88 of the unit cell 20. The second layout 90 is configured for the power beam frequency being less than the primary RF frequency. The center portion of FIG. 7 illustrates a layout for the free space side 92 of the unit cell 20. The free space side 92 is opposite the feed side 88. Each of the layouts 86, 90 includes an RF patch conductor 94. The first layout 86 includes four rectenna patch conductors 96 arranged around the RF patch conductor 94 and connected thereto by DC power conductors 98 and coplanar striplines 100. Various electronic components 102 are distributed along the coplanar striplines 100. In the second layout 90 a folded dipole antenna element 103 extends around the RF patch conductor 94 and includes various electronic components 102 distributed at the antenna element feed point. A coplanar stripline 100 extends from the RF patch conductor 94 on the free space side 92 of the unit cell 20. All of the conductors, striplines and electronic components of the unit cell 20 abut a dielectric sheet 104.

The illustrated layouts 86, 90 are based on the use of edge-fed patch antenna elements with a common dielectric slab thickness. Also, while in the second layout 90 a folded dipole rectenna element 103 is showing other antenna element types are possible. The unit cell physical dimensions are based on the primary RF element spacing requirement to have no grating lobes in the physical space at the maximum antenna electronic scan angle. An all surface-mount design is shown, although cavity fed patch elements with the rectenna devices mounted under the patch dielectric material may be used instead. The rectenna patches are shown with a polarization that is perpendicular to the primary RF patch so as to increase the mutual element isolation. However, those of ordinary skill in the art will appreciate that alternative configurations are possible.

The techniques described above can also be applied to a reflectarray (not shown), which is a slight variation on the space-fed array. The reflectarray is different from the space-fed array in that the reflectarray unit cell only has one primary RF antenna element. The feed or far-field energy is received by this element, and is phase shifted as in the space-fed design. However, the waveguide is then terminated in a short and the energy is reflected out through the phase shifter and toward the feed or the target.

In certain embodiments, multiple power beam feeds might be employed with each feed at a higher gain and illuminating a portion of the array surface. The modulation control data stream then only addresses the elements that are illuminated by each feed antenna. Likewise, a higher gain, smaller beam-size power beam might be used that electronically rasters (scans) over the antenna surface. Again, the control data modulation is matched to the elements that are illuminated in that instant. In this method a power storage device (capacitor or the like) may provide energy to power the unit cell 20 when it is not illuminated by the power beam.

Existing arrays, including both monolithic, corporate-fed planar arrays and space-fed arrays, require that all power and command and control of the array be accomplished via multilayer circuit board backplanes where each layer carries the power RF, signal, control and built-in-test and fault-isolation-test (BIT/FIT). These boards are thick and heavy. The backplane must be electrically contiguous for each layer over the complete area of the antenna. Consequently, the entire antenna backplane is a single unit. The backplane alone is typically approximately 5 kg/m$^2$ areal density (or more).

Figure 8:
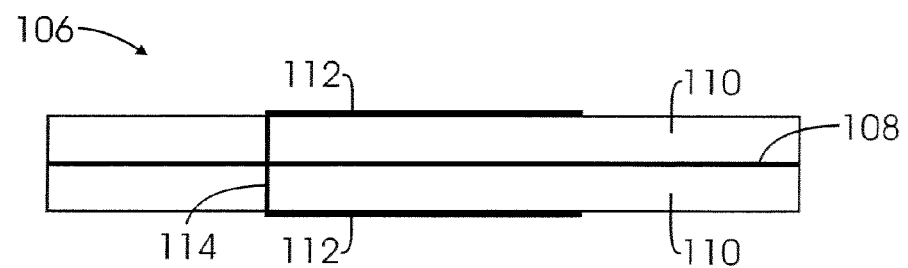
FIG. 8 is a schematic, cross-sectional diagram of one embodiment of a backplane for the wireless, space-fed phased array antenna of FIG. 1.

FIG. 8 illustrates a schematic cross-sectional view of one embodiment of the present wireless phased array backplane 106, which can advantageously be very thin and light. In the illustrated embodiment, a single conducting layer 108 is sandwiched between dielectric layers 110. Those of ordinary skill in the art will appreciate that additional conducting layers and/or additional dielectric layers may be provided. Patch antenna conducting layers 112 sandwich the dielectric layers 110, and a via 114 connects the patch antenna conducting layers 112. These layers are configured for surface mounting of assemblies such as antenna elements and inclusion of power and signal carrying conductors as a coplanar stripline or similar structure.

The conducting layer 108 may be, for example, aluminized Mylar, and the dielectric layers 110 may each be Kapton or another similar material. The conducting layer 108 may be as thin as 0.001", as may be the patch antenna conducting layers 112. The thickness of the conducting layer 108 may be influenced by the antenna design frequencies. The dielectric layers 110 may each be much less than a wavelength thick at the primary RF operating frequency. The total weight of the illustrated wireless phased array backplane analog may be less that 1 kg/m$^2$. In certain embodiments structure may be added for mechanical durability for specific applications, but it is not essential to the basic technology. The ground plane preferably has a complete circuit over that span of the array antenna.

Many current phased array antennas are constructed as monolithic entities. The antenna backplane is a single, physical electromechanical entity. All such arrays are planar arrays (circular or rectangular). Because of their requirements for signal, control, data, and power distribution, these antennas cannot be physically broken down for ease of transport and reassembled for operation. The transport mechanism must be integrated into the antenna (or vice versa), thereby creating a larger transport problem. This problem also plagues large space communications reflector antennas.

By contrast, in the present wireless phased array all RF, power, signal and control functions are wireless. No physical connections are required to the antenna. Likewise, the antenna comprises discrete pieces the size of a single unit cell 20. It can therefore be simply mechanically assembled and disassembled. Only the ground plane requires an unbroken circuit. Thus, a sizable aperture (several square meters or more), whether planar or otherwise, may be routinely assembled from identical subassemblies. The ability to disassemble and reassemble also facilitates the repair of a non-functioning panel. The panel can simply be mechanically replaced with no electrical interconnects.

The elimination of the internal manifolds in the present wireless phased array reduces the array integration to a purely mechanical operation. It also opens the possibility of very inexpensive nonplanar antenna architectures, such as circular or cylindrical, and hemispherical arrays. A hemispherical array, with proper feed design would be capable of omnidirectional operation over 2 pi steradians of solid angle.

The space-fed array, or reflectarray, is advantageous for applications where depth is available to accommodate the feed separation from the objective antenna, such as non-conformal applications and where the feed-objective array separation ranges between 0.5-2 (separation=f/D where f is the feed distance and D is the array dimension). Such geometry is permissible in applications such as space antennas or ground-based antennas for counter-battery radar, air target or anti-personnel surveillance, or space communications. In these applications many advantages arise. In the space-based antenna application, the lack of internal array manifolds means that more antenna area can be stored within the confines of the booster shroud. Larger antennas can thus be deployed in applications that are limited by achievable antenna size (gain). It is also possible that smaller antennas with lower mass and stowed volume can be realized, possibly permitting the use of smaller launch vehicles and/or payload fairings.

The above description presents the best mode contemplated for carrying out the present system and methods for radar and communications applications, and of the manner and process of making and using them, in such full, clear, concise, and exact terms as to enable any person skilled in the art to which they pertain to make this system and use these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A system configured for radar or communications applications, comprising:
   a wireless, space-fed, phased array of antennas including a plurality of unit cells; wherein
   a first one of the unit cells includes
      a first one of the antennas;
      at least one receive antenna configured to receive a wireless combined power/control signal by the unit cell;
      a receiver configured to recover a command from the received combined power/control signal;
      a unit cell command interpreter configured to receive the command, determine whether the command is intended for the first unit cell, and relay the command to logic for enabling a phase shift controller of the first antenna; and
      a power converter configured to produce direct current power to run electrical components of the unit cell, including the phase shift controller, from the received combined power/control signal.

2. The system of claim 1, wherein the unit cell command interpreter includes an address correlator configured to store an address of the first unit cell.

3. The system of claim 2, wherein the unit cell command interpreter includes an N-bit buffer configured to store the command and to compare an address field of the command with the first unit cell address stored in the address correlator to determine whether the command is intended for the first unit cell.

4. The system of claim 1, wherein the unit cell command interpreter includes an M-bit serial-to-parallel converter configured to remove command subfields for control functions within the unit cell and for functioning of the array.

5. The system of claim 1, wherein the unit cell command interpreter includes a K-bit correlator configured to enable a phase shift controller of first unit cell.

6. The system of claim 1, further comprising a power and control beam transmit unit configured to beam a microwave signal forming the combined power/control signal to illuminate the array.

7. The system of claim 6, wherein the power converter is configured to convert the microwave signal into direct current and to supply the direct current to the electrical components of the first unit cell to power the electrical components of the first unit cell.

8. The system of claim 7, wherein the power converter comprises at least one rectenna.

9. The system of claim 6, further comprising a beam steering computer configured to generate the command in a digital format.

10. The system of claim 9, further comprising a modem configured to convert the command into an analog format.

11. The system of claim 10, wherein the power and control beam transmit unit is configured to amplify a signal received from the modem, the signal containing the command.

12. A method for radar or communications applications, the method comprising the steps of:
   wirelessly beaming a combined power/control signal from a power and control beam transmit unit to illuminate a wireless, space-fed, phased array of antennas, the array including a plurality of unit cells;
   converting the combined power/control signal into direct current within a first one of the unit cells, the first unit cell including a first one of the antennas;
   supplying the direct current to electrical components of the first unit cell, including a phase shift controller, to power the electrical components of the first unit cell;
   recovering a command from the combined power/control signal within the first unit cell;
   determining whether the command is intended for the first unit cell; and
   relaying the command to logic for enabling the phase shift controller of the first antenna.

13. The method of claim 12, wherein the combined power/control signal is converted into direct current by at least one rectenna of the first unit cell.

14. The method of claim 12, wherein the step of determining whether the command is intended for the first unit cell is performed by an N-bit buffer and an address correlator of the first unit cell.

15. The method of claim 12, wherein the logic for enabling the phase shift controller comprises a K-bit correlator.

* * * * *